United States Patent
Wood et al.

(10) Patent No.: US 6,603,634 B1
(45) Date of Patent: Aug. 5, 2003

(54) COMPRESSIVE SPRING SLEEVE FOR REDUCING DISC SLIPPAGE

(75) Inventors: Roy L. Wood, Yukon, OK (US); Michael J. Raffetto, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/326,067

(22) Filed: Jun. 4, 1999

Related U.S. Application Data

(60) Provisional application No. 60/088,059, filed on Jun. 5, 1998.

(51) Int. Cl.[7] .............................................. G11B 17/02
(52) U.S. Cl. ................................................... 360/98.08
(58) Field of Search ......................... 360/98.01, 98.02, 360/98.08, 99.12, 97.03, 99.05, 99.11; 369/270, 282; 206/444; 403/372

(56) References Cited

U.S. PATENT DOCUMENTS

| | | | | |
|---|---|---|---|---|
| 3,269,204 A | | 8/1966 | Schleicher, Jr. | |
| 3,626,743 A | | 12/1971 | Koch | |
| 3,633,398 A | | 1/1972 | Koch | |
| 3,700,271 A | | 10/1972 | Blaurock et al. | |
| 3,776,653 A | | 12/1973 | Buzogany | |
| 3,838,928 A | | 10/1974 | Blaurock et al. | |
| 4,286,894 A | | 9/1981 | Rongley | |
| 4,754,351 A | | 6/1988 | Wright | |
| 4,790,683 A | | 12/1988 | Cramer et al. | |
| 4,819,105 A | | 4/1989 | Edwards | |
| 4,828,423 A | | 5/1989 | Cramer, Jr. et al. | |
| 4,896,239 A | | 1/1990 | Ghose | |
| 5,006,942 A | * | 4/1991 | Brooks et al. | 360/99.08 |
| 5,136,450 A | | 8/1992 | Moir | |
| 5,274,517 A | | 12/1993 | Chen | |
| 5,295,030 A | | 3/1994 | Tafreshi | |
| 5,315,465 A | | 5/1994 | Blanks | |
| 5,333,080 A | | 7/1994 | Ridinger et al. | |
| 5,367,418 A | | 11/1994 | Chessman et al. | |
| 5,436,775 A | | 7/1995 | Ishimatsu | |
| 5,452,157 A | | 9/1995 | Chow et al. | |
| 5,517,376 A | | 5/1996 | Green | |
| 5,528,434 A | | 6/1996 | Bronshvatch et al. | |
| 5,600,512 A | * | 2/1997 | Radwam et al. | 360/99.08 |
| 5,663,851 A | | 9/1997 | Jeong et al. | |
| 5,712,746 A | | 1/1998 | Moir et al. | |
| 5,760,999 A | * | 6/1998 | Yahata | 360/98.01 |
| 5,761,002 A | | 6/1998 | Moir et al. | |
| 5,781,374 A | * | 7/1998 | Moir et al. | 360/99.12 |
| 5,790,346 A | | 8/1998 | Fletcher | |
| 5,801,901 A | | 9/1998 | Bryan et al. | |
| 5,811,678 A | | 9/1998 | Hirano | |
| 5,828,518 A | * | 10/1998 | Moir et al. | 360/99.12 |
| 5,872,682 A | | 2/1999 | Saichi et al. | |
| 5,880,906 A | | 3/1999 | Lindrose | |
| 5,912,784 A | | 6/1999 | Bronshvatch et al. | |
| 5,917,677 A | * | 6/1999 | Moir et al. | 360/99.12 |

FOREIGN PATENT DOCUMENTS

| | | | |
|---|---|---|---|
| JP | 5-151740 | | 6/1993 |
| JP | 5-151740 | * | 7/1993 |

* cited by examiner

Primary Examiner—Hoa T. Nguyen
Assistant Examiner—Tianjie Chen
(74) Attorney, Agent, or Firm—Fellers, Snider, et al.

(57) ABSTRACT

The present invention provides a compressive spring sleeve to reduce disc slippage in a disc drive resulting from non-operational mechanical shock, the disc drive having data storage discs in the form of a disc stack supported on the cylindrical hub of a spindle motor which spins the disc stack at a very high rotational speed. An annular space is provided between the inner diameters of the bores of the discs and the spacers and the outer diameter of the spindle motor hub, and the compressive spring sleeve is disposed in the annular space. The compressive spring sleeve has a spring body portion having radially extending and spaced apart peaks disposed about the circumference of the spring body portion to press against the discs at their inner diameters and thereby exert a restraining radial force against the discs so that the discs are maintained in a fixed concentric relationship relative to the spindle motor hub when a non-operational shock is exerted on the disc drive.

15 Claims, 4 Drawing Sheets

COMPRESSIVE SPRING SLEEVE FOR REDUCING DISC SLIPPAGE

RELATED APPLICATIONS

This application claims the benefit of U.S. Provisional Application No. 60/088,059 filed Jun. 5, 1998.

FIELD OF THE INVENTION

This invention relates generally to the field of hard disc drive data storage devices, and more particularly, but not by way of limitation, to improving disc stack balance and stiffness of a disc pack in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless direct current spindle motor. In disc drives of the current generation, the spindle motor rotates the discs at speeds of up to 10,000 revolutions per minute.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets which are fixedly mounted to the disc drive housing base member. On the side of the actuator bearing housing opposite to the coil, the actuator bearing housing also typically includes a plurality of vertically aligned, radially extending actuator head mounting arms to which the head suspensions mentioned above are mounted. When controlled direct current is applied to the coil a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments as well as in laptop computers which, because of their portability, can be used wherever they can be transported. Because of this wide range of operating environments the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperatures ranging, for instance, from −5° C. to 60° C., and further be capable of withstanding operating mechanical shocks of 100G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature and cleanliness controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, is on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued to Bronshvatch et al. on Jun. 18, 1996; U.S. Pat. No. 5,517,376, issued to Green on May 14, 1996; U.S. Pat. No. 5,452,157, issued to Chow et al. on Sep. 19, 1995; U.S. Pat. No. 5,333,080, issued to Ridinger et al. on Jul. 26, 1994; U.S. Pat. No. 5,274,517, issued to Chen on Dec. 28, 1993; and U.S. Pat. No. 5,295,030, issued to Tafreshi on Mar. 15, 1994, all assigned to the assignee of the present invention. In each of the noted disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, an axial force is applied to the disc stack and a disc clamp is attached to the spindle motor hub to retain a clamping force. This axial clamping force is passed through the discs and disc spacers and squeezes the disc stack between the disc clamp and the disc mounting flange on the spindle motor hub. This technique requires that the resulting friction between the clamp and top disc and between the bottom disc and disc mounting flange be sufficient to resist movement of the entire disc pack in response to a shock event.

With an industry trend toward size reduction in the overall disc drive, the size of various components within the disc drive has necessarily been reduced, including the thickness of the discs. As the discs have become thinner, the amount of clamping force that can be applied to the discs without causing excessive mechanical distortion of the discs is limited. That is, variation in the flatness of the disc mounting flange, the discs, and the disc spacers contribute to flatness concerns of the discs relative to the heads. The elastic modulus of the disc material, too, affects the flatness of the joined assembly providing the disc pack. These and other factors limit the axial clamping force that can be applied using presently available techniques. Morever, such axial clamping forces resist but do not completely prevent radial displacement of the discs (also so referred to as disc slippage) during application of non-operational shock to the disc drive.

With continued demand for ever increasing levels of mechanical shock resistance, there remains a continued need for improvements in preventing disc slippage during such non-operational shock. It is to such improvements that the present invention is directed.

SUMMARY OF THE INVENTION

The present invention reduces disc slippage resulting from non-operational mechanical shock on a disc drive. In a disc drive, data storage discs in the form of a disc stack are supported on the cylindrical hub of a spindle motor which spins the disc stack at a very high rotational speed. The discs are alternately stacked with interposed spacers on the hub and an annular space is provided between the inner diameters of the bores of the discs and spacers and the outer diameter of the spindle motor hub.

The compressive spring sleeve of the present invention, disposed in the annular space surrounding the spindle motor hub, has a spring body portion with radially extending peaks disposed about the circumference of the spring body portion which press against the inner diameters of the spacers and the outer diameter of the spindle motor hub. When a non-operational shock is exerted on the disc drive, an opposing, radial force is imposed on the inner diameters of the spacers by the radially extending peaks of the compressive spring sleeve. Such a radial force, in combination with the radial friction created by the axial clamp force upon the disc stack, maintains the discs in a fixed concentric relationship relative to the spindle motor hub.

The objects, advantages and features of the present invention will be apparent from the following detailed description when read in conjunction with the drawings and appended claims.

DETAILED DESCRIPTION

Figure 1:
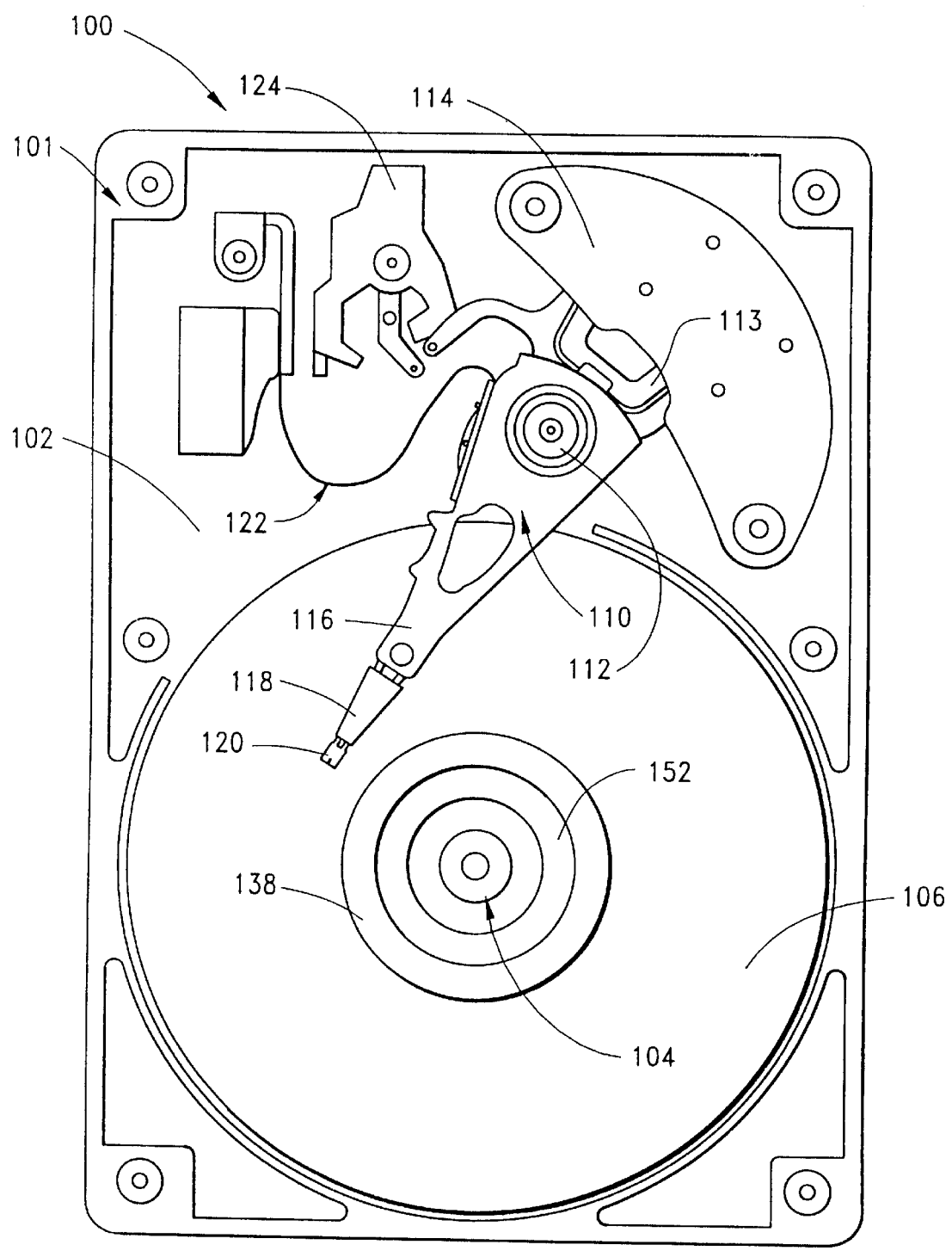
FIG. 1 is a top view of a disc drive of the type in which the present invention is particularly useful, the disc drive shown with its top cover removed.

A detailed description of various presently preferred embodiments of the present invention will commence with reference to FIG. 1 which shows a disc drive 100 used to store computer data. The disc drive 100 includes a head-disc assembly (HDA) 101 and a printed wiring assembly (PWA) which is mounted to the underside of the HDA. Although not visible in FIG. 1, it will be understood that the PWA is used to control the operation of the HDA 101.

A top cover (omitted from FIG. 1) mates with a base deck 102 to provide an environmentally controlled environment for the HDA 101. A spindle motor (generally designated at 104) is supported by the base deck 102 and rotates a plurality of axially aligned discs 106 at a constant high speed. A disc clamp 138 is used to clamp the discs 106 relative to the spindle motor 104.

The discs 106 include recording surfaces (not separately identified in FIG. 1) to which user data are written by way of a rotary actuator 110, which rotates about a cartridge bearing assembly 112 in response to the application of current to a coil (113, a portion of which is visible in FIG. 1) of a voice coil motor (VCM) 114. The actuator 110 includes a plurality of rigid arms 116, each of which supports a corresponding flexible suspension assembly 118. Each suspension assembly 118 in turn supports a head 120 over one of the respective recording surfaces of the discs 106 by an air bearing established by air currents set up by the high speed rotation of the discs 106. It will be noted that the suspension assemblies 118 provide spring forces which urge the heads 120 toward the respective disc surfaces, and the heads 120 are provided with aerodynamic features that fly the heads 120 over the disc surfaces in a highly stable manner.

A flex circuit assembly 122 facilitates electrical interconnection between the actuator 110 and the disc drive PWA. A latch 124 secures the actuator 110 when the disc drive 100 is deactivated, allowing the heads 120 to safely come to rest upon landing zones (not separately identified) located at the innermost radii of the discs 106. The landing zones are preferably texturized to prevent stiction forces from undesirably adhering the heads 120 to the landing zones.

Figure 2:
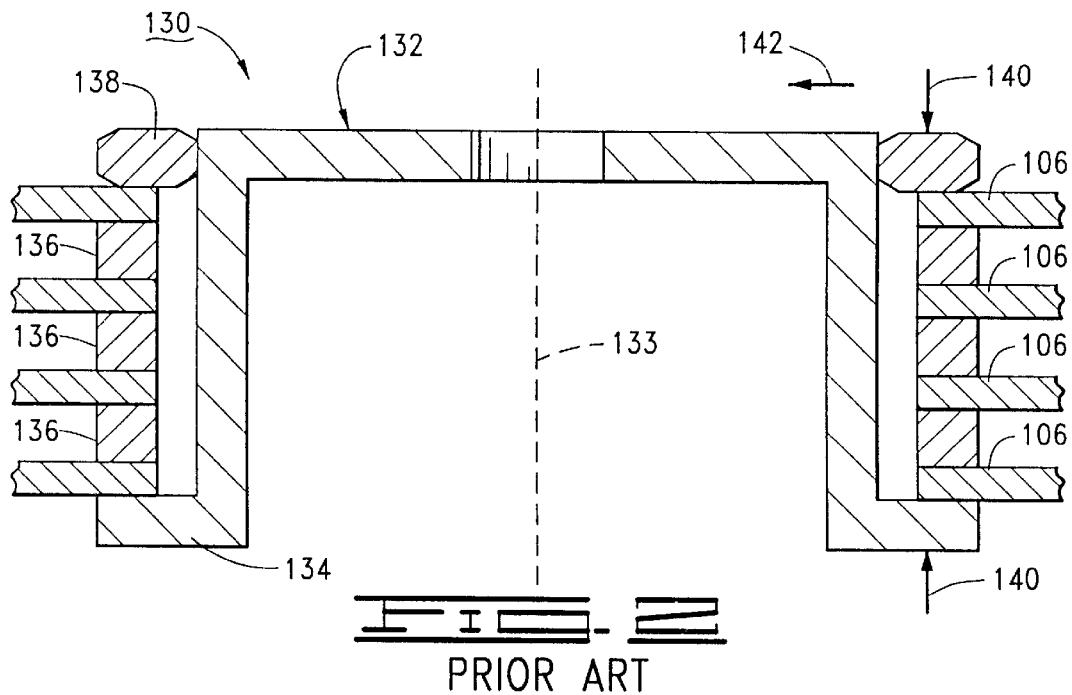
FIG. 2 is a semi-detailed cross-sectional view of a disc stack of a prior art disc drive showing alternately spaced discs and spacers supported on hub of a spindle motor.

Turning to FIG. 2, shown therein is an elevational cross-sectional view of portions of a prior art spindle motor assembly 130 which utilizes only axial loading to secure the discs 106 by way of friction. As interior portions of the spindle motor 130 are not germane to the present invention, for purposes of clarity such have been omitted from FIG. 2.

A rotatable spindle motor hub 132 of the spindle motor 130 rotates about a central axis 133 and includes a radially extending disc support flange 134. A plurality of discs 106 (nominally identical to the discs of FIG. 1) and disc spacers 136 are arranged about an outer hub surface (not designated) to form a disc stack. The disc stack is assembled by placing a first one of the discs 106 over the spindle motor hub 130 to rest against the disc support flange 132. Disc spacers 136 and discs 106 are alternately added to the stack until a desired number of discs 106 have been positioned (four in this example). A disc clamp 138 is then assembled to the upper end of the hub 132 to complete the assembly. It should be noted that the discs 106 and the spacers 136 have bores with inner diameters determined in size so that the discs 106 and spacers 136 fit over the spindle motor hub 132 as shown for support on the disc support flange 134.

In FIG. 2, the disc clamp 138 is a "shrink fit" clamp which has an inner diameter that is nominally smaller than the outer diameter of the hub 132. Assembly is accomplished by heating the clamp 138 so that thermal expansion permits the disc clamp 138 to pass over the hub 132. A desired magnitude of axial loading force is applied to the disc clamp 138 while the clamp is allowed to cool and shrink fit onto the outer surface of the spindle motor hub 132. The axial clamping force applied by the disc clamp 138 and the disc support flange 134 are schematically illustrated by vectors 140. It will be noted that the selected material and geometry of the disc clamp will generally determine the maximum amount of axial clamping force that can be exerted by the clamp.

A drawback to such a clamping methodology is that axial clamping forces that would be sufficient to prevent radial displacement would cause unacceptable disc distortion. Specifically, since the bore of the discs 106 must be at least slightly larger than the outer diameter of the spindle motor hub 130 to allow for assembly of the discs 106 to the spindle motor hub 130, the discs 106 are subject to differential thermal expansion and applied mechanical shocks after assembly. The discs 106 are therefore subjected to radial forces which could cause radial shifting. Because the clamping forces applied to the disc stack are in the axial direction, the only resistance to such radial shifting of the discs 106 is, therefore, a function of the amount of applied axial force and the coefficient of friction.

Figure 3:
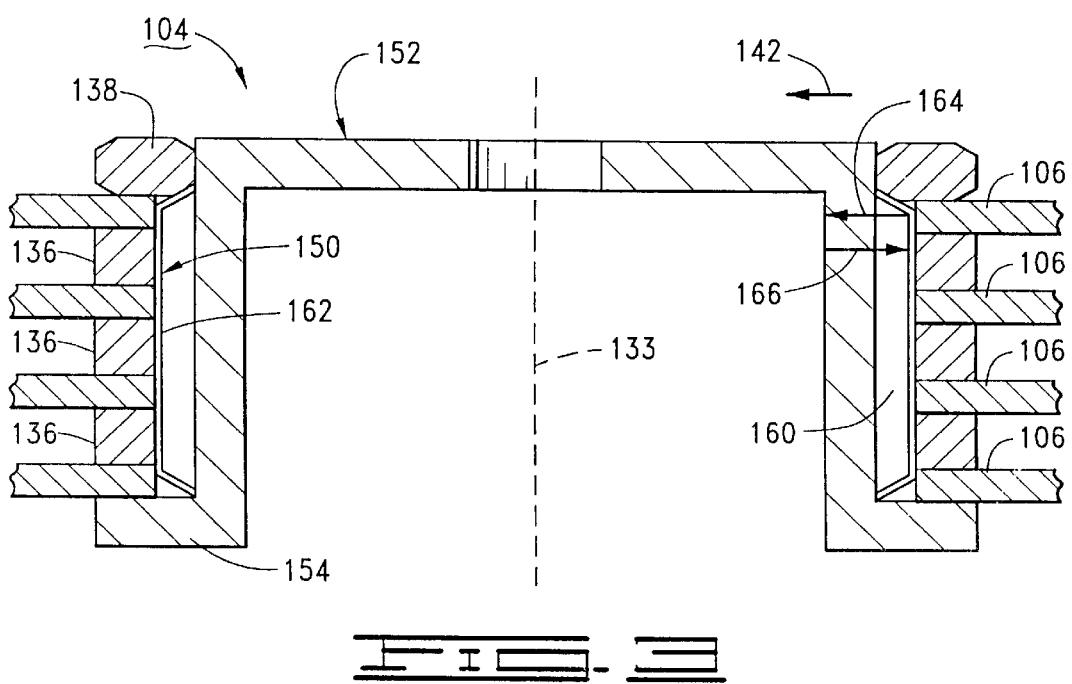
FIG. 3 is a semi-detailed cross-sectional view of a plurality of discs and alternately interposed spacers supported on the hub of a spindle motor, a compressive spring sleeve of the present invention disposed between the alternately spaced discs and spacers and the outer diameter of the spindle motor hub.

FIG. 3 illustrates a compressive spring sleeve 150 which achieves radial stiffness for the discs 106 and spacers 136, which in combination with axial load induced friction forces, prevent the discs 106 from radial displacement, or disc slippage. It should be noted that the same numerals as in prior art FIG. 2 are provided for the components that are nominally identical to the components disclosed in FIG. 2. The spindle motor 104 includes a rotatable spindle motor hub 152 which is configured for rotation about the central axis 133. A disc support flange 154 radially extends from the rotatable spindle motor hub 152 to support the discs 106 and the spacers 108. A disc clamp 138 is attached to the spindle motor hub 152 in the manner described above for the disc clamp 138. The disc clamp 138 and the disc support flange 154 cooperate to clamp the discs 106 and the spacers 108 onto the spindle motor hub 150. The compressive spring sleeve 150 is disposed about the spindle motor hub 152 within the annular space between the discs 106, the spacers 136 and the outer surface of the spindle motor hub 152.

The disc spacers 136 serve to establish the axial spacing between adjacent discs 106 in the disc stack, and the disc clamp 158 applies an axial force to the discs 106 and spacers 108 to provide the spaced-apart axial position of the discs 106. In addition to this axial clamping force, the radial position of the discs 106 are maintained by the interaction of the compressive spring sleeve 150 and the discs 106, spacers 136, and spindle motor hub 152.

Figure 4:
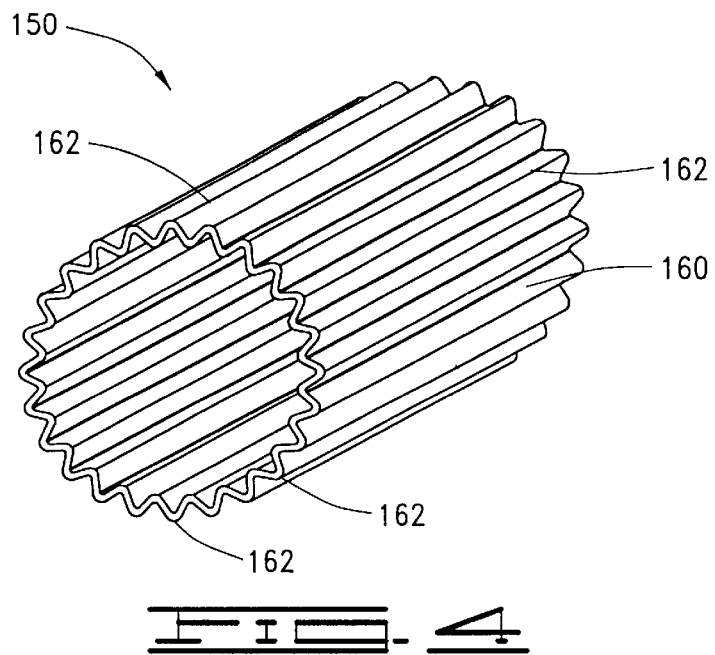
FIG. 4 is a perspective view of the compressive spring sleeve of FIG. 3.

As shown in FIG. 3, the compressive spring sleeve 150 abuts against the inner diameters of the discs 106 and the spacers 136 as well as the spindle motor hub 152. As shown in FIG. 4, the compressive spring sleeve 150 is a hollow tubular member with a spring body portion 160 that is convoluted to create radially extending peaks 162. The length of the spring body portion 160 is selected so that the compressive spring sleeve circumferentially extends about a substantial portion of the spindle motor hub 152. It will be appreciated that the spring body portion 160 of the compressive spring sleeve 150 may be convoluted along its entire length or along only selected portions of its length. A person skilled in the art will also recognize that the convoluted peaks 162 may be either intermittently or uniformly distributed. The operative inner diameter of the compressive spring sleeve 150 is selected to cooperate with the outer diameter of the spindle motor hub 152 and the bore of the discs 106 in a manner to be described below. Also, although not illustrated, the compressive spring 150 can have a longitudinally extending slit should such be desired as a manufacturing or assembly expedient.

Returning to FIG. 3, the radially extending peaks 162 engage against the inner diameters of the discs 106 and spacers 136 to exert a radial force shown as vector 164 against the discs 106 and spacers 136 while exerting an opposing radial force in the opposite direction, vector 166, against the spindle motor hub 152. Upon application of a non-operational mechanical shock, a displacing force indicated as the vector 142 acts against the vector forces 164,166 to displace the discs 106 toward the spindle motor hub 152. However, because of the engagement of the compressive spring sleeve 150 with the spindle motor hub 152, as well as vector forces 164,166, the compressive spring sleeve 150 provides radial stiffness for both the discs 106 and the spacers 136 to oppose the radial displacing force. The compressive spring sleeve 150 therefore effectively causes the discs 106 to be centered on the hub 150 during assembly, thus improving the overall balancing of the disc stack and preventing displacement during application of non-operational shock.

Furthermore, the radial forces 164,166 allow the application of a lighter clamp load by the clamp 138 to maintain the balance of the disc stack. Essentially, the compressive spring sleeve 150 abuts the spacers 136 to provide radial stiffness for the spacers 136, and through the frictional forces induced by the axial clamp load onto the adjacent discs 106, the discs 106 are able to resist radial displacement. Thus, a reduced clamp load is required to allow the spacers 136 to maintain disc flatness under axial non-operational shock.

Figure 5:
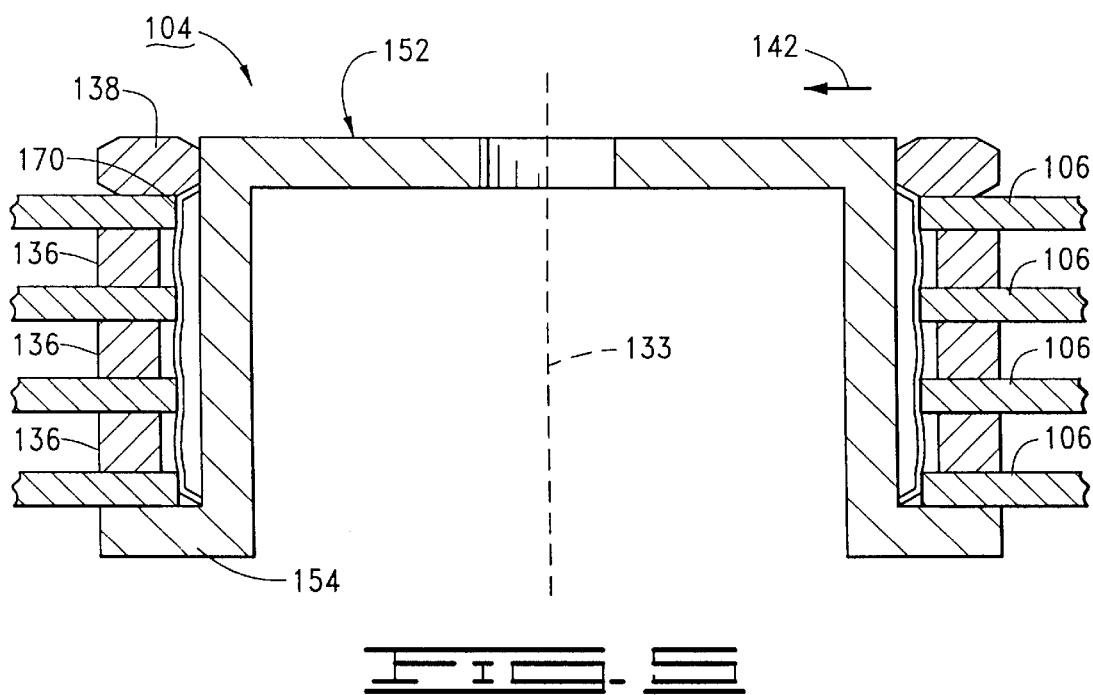
FIG. 5 is a semi-detailed cross-sectional view of a disc stack having another embodiment of the compressive spring sleeve of the present invention.

Turning now to FIG. 5, provided therein is an alternative embodiment of the present invention. FIG. 5 is a cross-sectional, elevational view of a disc stack wherein a compressive spring sleeve 170 is shown which is shaped to engage only the discs 106 and the spindle motor hub 152. To effectuate assembly, the bores of the spacers 136 are provided with inner diameters larger than the inner diameters of bores of the discs 106, and the spacers 136 are alternately placed with the discs 106 about the spindle motor hub 152. The compressive spring sleeve 170 can readily accept variations in the inner diameters of the discs 106 when the compressive spring sleeve 170 is not compressed against the spacers 136, thus simplifying the manufacturing of such a compressive spring sleeve 170.

As described above, radial forces exerted by the compressive spring sleeve 170 against the discs 106 and the spindle motor hub 152 prevent radial displacement of the discs 106 during non-operational shock. Axial clamp loading by the clamp 138 is determined to just be sufficient while maintaining disc flatness during the application of an axial shock.

Figure 6:
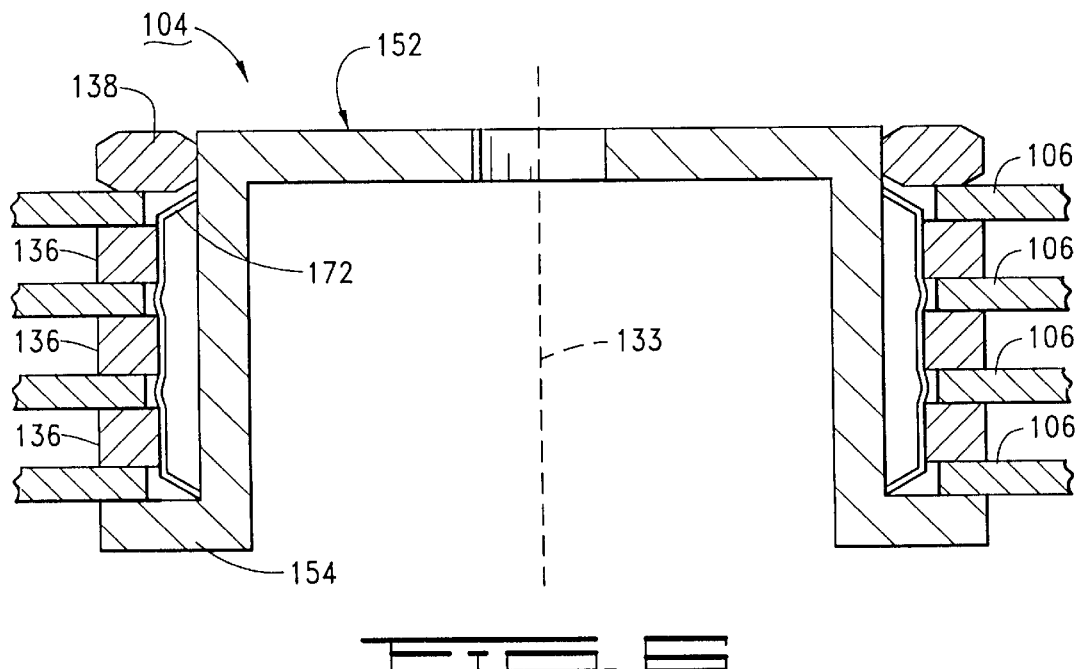
FIG. 6 is a semi-detailed cross-sectional view of a disc stack having yet another embodiment of the compressive spring sleeve of the present invention.

Referring now to FIG. 6, shown therein is a compressive spring sleeve 172 which compressingly engages only the spacers 136 and the spindle motor hub 152. This embodiment, as well as that illustrated in FIG. 7 to be discussed below, provides cost effective tolerance control since the inner diameters of the bores of the spacers 136 are more precisely manufactured than the inner diameters of the discs 106, and therefore the inner diameters of the spacers 136 more readily engage the compressive spring sleeve 172. As shown, the compressive spring sleeve 172 in the disc stack of discs 106 and disc spacers 136, is disposed in the annular space between the spindle motor hub 152 and the spacers 136. The compressive spring sleeve 172 compresses against the inner diameters of the spacers 136 without contacting the discs 106 to provide radial stiffness to the spacers 136. The frictional forces between the spacers 136 and the discs 106, in conjunction with the axial clamp load force of the clamp 138, provide radial isolation of the adjacent discs 106. Such radial isolation also provides isolation of the radial displacement force 142 for each disc 106. Therefore, the clamp load force is distributed such that the friction induced by such clamp load force resists each isolated amount of radial displacement force for each disc 106. A clamp load force sufficient to resist the radial displacement force exerted on a single disc 106 therefore effectively prevents radial displacement of the discs 106 of the disc stack.

Figure 7:
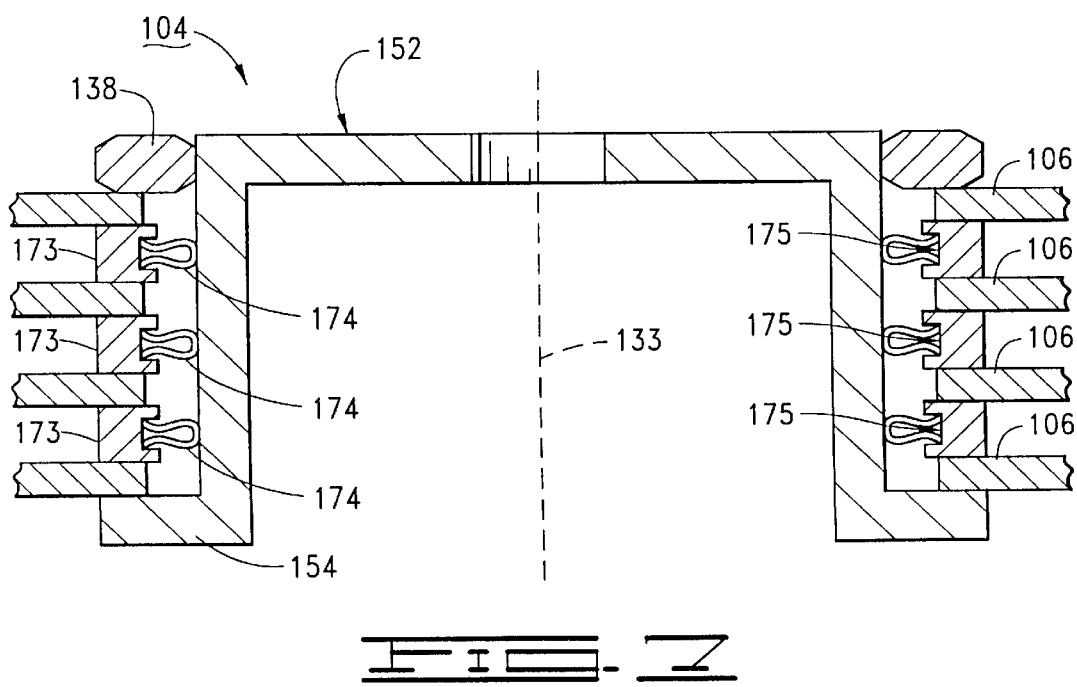
FIG. 7 is a semi-detailed cross-sectional view of one other embodiment of the compressive spring of the present invention.

FIG. 7 shows a disc stack with a plurality of compressive spring sleeves 174, each compressive spring sleeve 174 being disposed within an inner diameter of one of a corresponding number of spacers 173. Each spacer 173 is provided with an annular groove 175 disposed about its center to allow its respective compressive spring sleeve 174 to be centered within the inner diameter of the spacer 173. It will be noted that the compressive spring sleeves 174 may be disposed about the centers of the spacers 173 through tooling without providing the annular grooves 175. Providing a plurality of compressive spring sleeves 174 create ease of manufacturing since more accurate contact between the spacers 173 and the compressive spring sleeves 174 can be achieved.

As described above, the compressive spring sleeves 174 compress the spacers 173 and the spindle motor hub 152 to provide radial stiffness to the spacers 173. Thus, similar to the embodiment disclosed in FIG. 6, the compressive spring sleeves 174, in cooperation with the axial clamp load force from the clamp 158, allow radial isolation of the discs 106 adjacent the spacers 173. In particular, the frictional forces between the spacers 173 and the discs 106, in conjunction with the axial clamp load force of the clamp 138, provide radial isolation of the radial displacement force 142 for each disc 106. Therefore, the clamp load force is distributed such that the friction induced by such clamp load force resists each isolated amount of radial displacement force for each disc 106. A clamp load force sufficient to resist the radial displacement force exerted on a single disc 106 therefore effectively prevents radial displacement of the discs 106 of the disc stack.

In accordance with the foregoing discussion, it will now be recognized that the present invention is directed to a disc drive having improved disc stack balance and stiffness.

As exemplified by the preferred embodiment, a compressive spring sleeve 150 to reduce disc slippage in a disc drive 100 resulting from non-operational mechanical shock. The disc drive 100 has data storage discs 106 in the form of a disc stack supported on the spindle motor hub 152 which spins the disc stack at a very high rotational speed. An annular space is provided between the inner diameters of the bores of the discs 106 and the spacers 136 and the outer diameter of the spindle motor hub 152. The compressive spring sleeve 150 is disposed in the annular space and has a spring body portion 160 having radially extending and spaced apart peaks 162 disposed about the circumference of the spring body portion to press against the discs 106 at their inner diameters and thereby exert a restraining radial force against the discs 106 so that the discs 106 are maintained in a fixed concentric relationship relative to the spindle motor hub 152 when a non-operational shock is exerted on the disc drive 100.

The present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and claimed herein.

What is claimed is:

1. A compressive spring sleeve for providing radial stiffness to a data storage disc stack, the compressive spring sleeve disposed about an outer diameter of a spindle motor hub and between inner diameters of a pair of discs and a spacer alternately stacked about the spindle motor hub and secured to the spindle motor hub by an axially directed clamping force, the spacer disposed between the discs to establish a desired inter-disc spacing, the compressive spring sleeve comprising:

a spring body portion; and radially extending peaks disposed about a circumference of the spring body portion and pressingly engaging the inner diameter of the spacer without contacting the discs, which upon application of a non-operational shock exert a radial force on the spacer, the radial force operating in conjunction with friction between the discs and the spacer induced by the axially directed clamping force to maintain the discs in a fixed concentric relationship relative to the spindle motor hub.

2. The compressive spring sleeve of claim 1, wherein the compressive spring sleeve is disposed within a centrally configured annular recess of the spacer.

3. The compressive spring sleeve of claim 1, wherein the radially extending peaks are uniformly distributed about the circumference of the spring body portion.

4. The compressive spring sleeve of claim 1, wherein the radially extending peaks are intermittently distributed about the circumference of the spring body portion.

5. A disc drive, comprising:

a basedeck; and a data storage disc stack mounted to the basedeck and comprising:

a spindle motor having a rotatable spindle motor hub with an outer diameter;

a pair of discs and a spacer alternately stacked about the spindle motor hub and having respective inner diameters greater than the outer diameter of the spindle motor hub, the spacer disposed between the discs to establish a desired inter-disc spacing;

a disc clamp exerting an axial clamping force upon the discs and disc spacer; and a compressive spring sleeve interposed between the inner diameters of the discs and spacer and the outer diameter of the spindle motor hub to pressingly engage the spacer to exert an outward radial force onto the spacer without contacting the discs, the outward radial force operating in conjunction with friction between the discs and the spacer induced by the axial clamping force to maintain the discs in a concentric relationship with the spindle motor hub in response to application of a non-operational shock to the disc drive.

6. The disc drive of claim 5, wherein the spacer comprises a centrally configured annular recess, and wherein the compressive spring sleeve projects into the annular recess.

7. The disc drive of claim 5, wherein the compressive spring sleeve is intermittently convoluted.

8. The disc drive of claim 5, wherein the compressive spring sleeve is uniformly convoluted.

9. The disc drive of claim 5, wherein the pair of discs are respectively characterized as first and second discs, wherein the spacer is characterized as a first spacer, wherein the disc drive further comprises a third disc and a second spacer disposed between the second and third discs to establish a desired inter-disc spacing between the second and third discs, and wherein the compressive spring sleeve further pressingly engages the second spacer to exert an outward radial force onto the second spacer without contacting the third disc.

10. The disc drive of claim 5, wherein the pair of discs are respectively characterized as first and second discs, wherein the spacer is characterized as a first spacer, wherein the compressive spring sleeve is characterized as a first compressive spring sleeve, wherein the disc drive further comprises a third disc and a second spacer disposed between the second and third discs to establish a desired inter-disc spacing between the second and third discs, and wherein the disc drive further comprises a second compressive spring sleeve which pressingly engages the second spacer to exert an outward radial force onto the second spacer without contacting the first, second and third discs.

11. A disc stack for use in a data storage disc drive, comprising:

a spindle motor having a rotatable spindle motor hub with an outer diameter;

a pair of discs and a spacer alternately stacked about the spindle motor hub and having respective inner diameters greater than the outer diameter of the spindle motor hub, the spacer disposed between the discs to establish a desired inter-disc spacing;

a disc clamp exerting an axial clamping force upon the discs and disc spacer; and a compressive spring sleeve interposed between the inner diameters of the discs and spacer and the outer diameter of the spindle motor hub to pressingly engage the spacer without contacting the discs to exert an outward radial force onto the spacer, the outward radial force operating in conjunction with friction between the discs and the spacer induced by the axial clamping force to maintain the discs in a concentric relationship with the spindle motor hub in response to application of a non-operational shock to the disc stack.

12. The disc stack of claim 11, wherein the spacer comprises an annular recess into which a portion of the compressive spring sleeve projects.

13. The disc stack of claim 11, wherein the pair of discs are respectively characterized as first and second discs, wherein the spacer is characterized as a first spacer, wherein the disc drive further comprises a third disc and a second spacer disposed between the second and third discs to establish a desired inter-disc spacing between the second and third discs, and wherein the compressive spring sleeve further pressingly engages the second spacer to exert an outward radial force onto the second spacer without contacting the third disc.

14. The disc stack of claim 11, wherein the pair of discs are respectively characterized as first and second discs, wherein the spacer is characterized as a first spacer, wherein the compressive spring sleeve is characterized as a first compressive spring sleeve, wherein the disc drive further comprises a third disc and a second spacer disposed between the second and third discs to establish a desired inter-disc spacing between the second and third discs, and wherein the disc drive further comprises a second compressive spring sleeve which pressingly engages the second spacer to exert an outward radial force onto the second spacer without contacting the first, second and third discs.

15. The disc stack of claim 11, wherein the compressive spring sleeve comprises a spring body portion and a number of radially extending peaks which extend from the spring body portion.

* * * * *